Oct. 22, 1929.   G. S. FRAZIER   1,732,933
STAIR TREAD AND METHOD OF MANUFACTURING SAME
Filed July 10, 1926   3 Sheets-Sheet 1

Inventor
George S. Frazier
Evans & McCoy
Attorneys

Oct. 22, 1929.  G. S. FRAZIER  1,732,933
STAIR TREAD AND METHOD OF MANUFACTURING SAME
Filed July 10, 1926   3 Sheets-Sheet 2
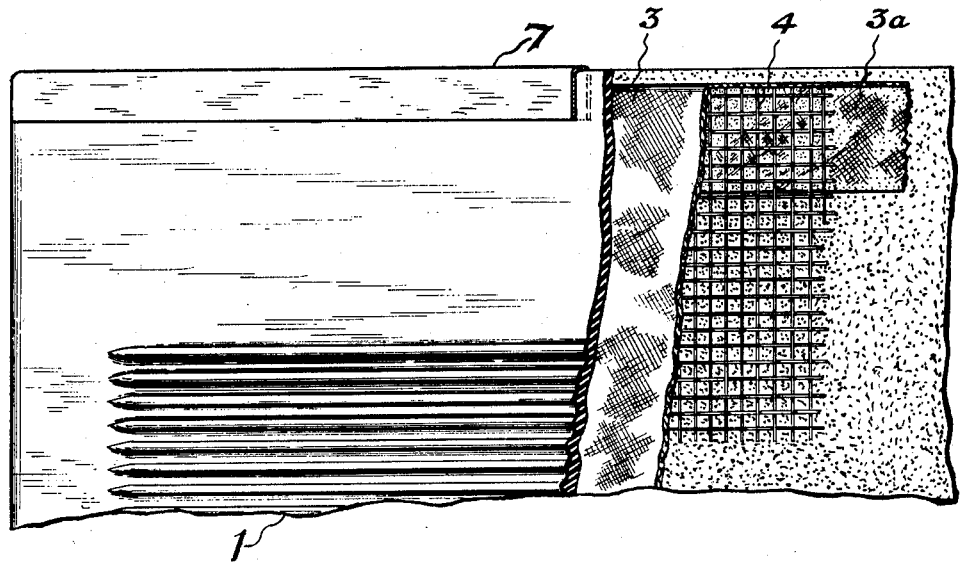
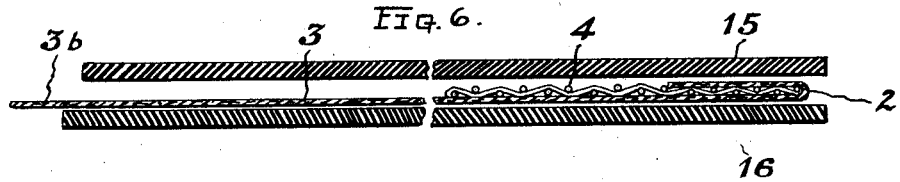
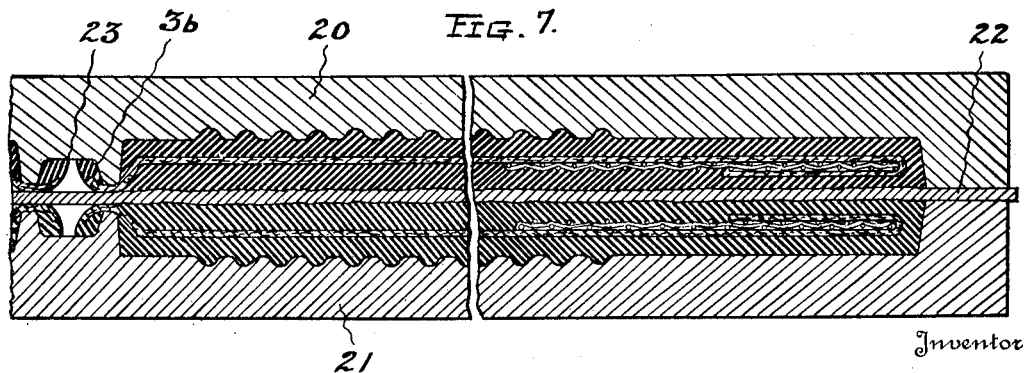
Inventor
George S. Frazier
By Evans & McCoy
Attorneys Oct. 22, 1929.  G. S. FRAZIER  1,732,933
STAIR TREAD AND METHOD OF MANUFACTURING SAME
Filed July 10, 1926  3 Sheets-Sheet 3
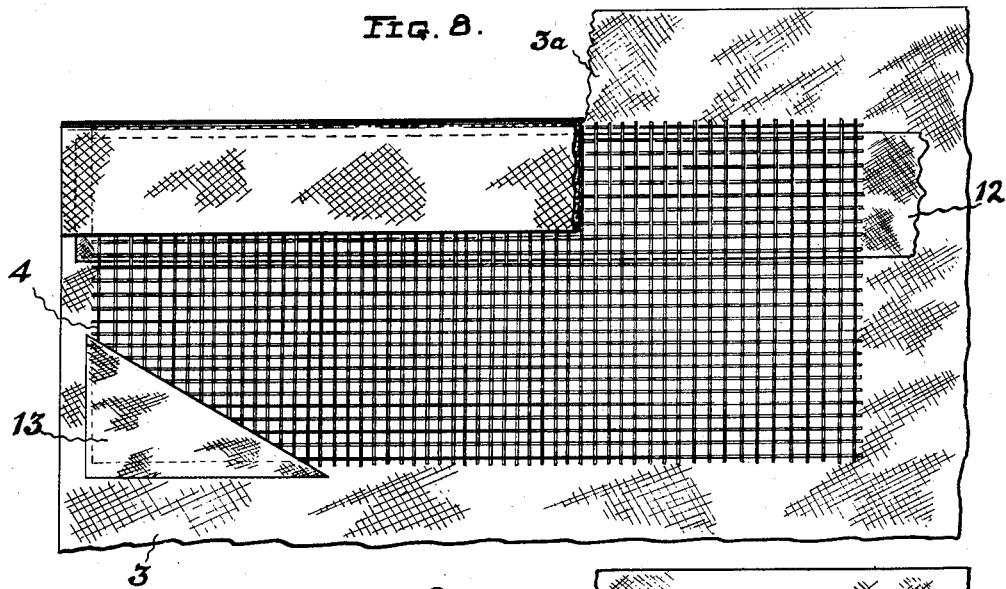
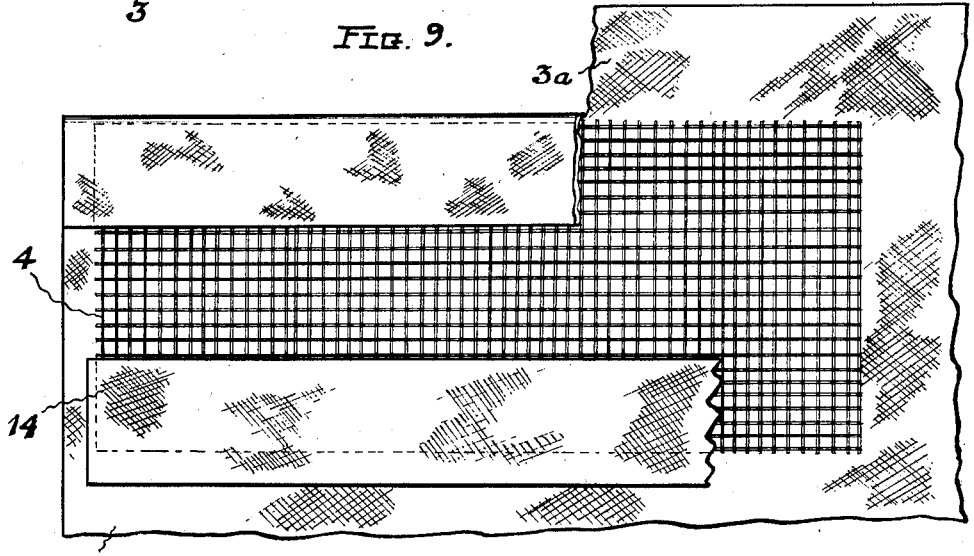
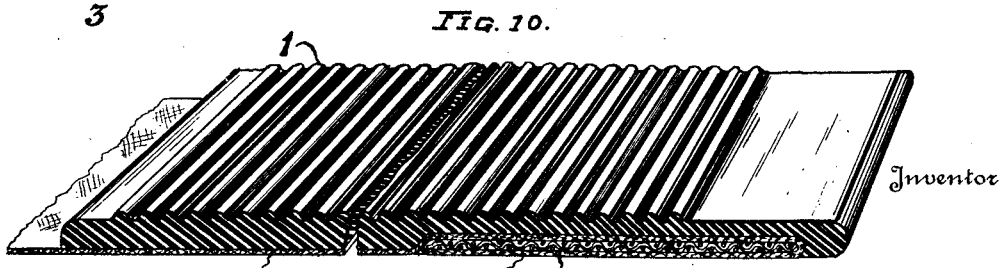
Inventor
George S. Frazier
By Evans & McCoy.
Attorneys Patented Oct. 22, 1929

1,732,933

UNITED STATES PATENT OFFICE

GEORGE S. FRAZIER, OF SEBRING, OHIO

STAIR TREAD AND METHOD OF MANUFACTURING SAME

Application filed July 10, 1926. Serial No. 121,638.

This invention relates to stair treads and particularly to tread units of molded rubber composition and the process of their manufacture.

The principal object of the invention is to provide a stair tread in which the nose of the tread is reenforced with a malleable material that may be bent to substantially the shape of the nose of the step to which the tread is applied.

Another object of this invention is to provide an embedded reenforcement for the nose portion of a stair tread that will distribute stresses through the body of the tread when in use.

A further object of the invention is to provide a series of corrugations on the upper tread surface of a stair tread that are so arranged as regards the reenforced tread body as to more evenly distribute the strain to which the tread is subjected in use through the body of the tread and that are raised above the reminder of the tread face.

An additional object of this invention is to provide a tread unit that will not slip when the nose of the tread is stepped upon by a user in service.

Another object of this invention is to provide a tread unit in which the unattached rear portion of the tread may be raised in order to remove dust or accumulated dirt from beneath the tread without removing any securing device.

A further object of my invention is to provide tread material of rubber composition having a localized reenforcement in the nose of the tread that can be supplied in any desired length.

An additional object of this invention is to provide an improved method of manufacturing a stair tread and tread material of the character proposed.

An additional object of this invention is to provide an improved form of corrugated tread surface that assists in deadening the noise of using the tread, that provides a more secure foothold for the user of the tread unit, and that also insures the engagement of the tread over the corrugated portion instead of over the body of the tread in order to more evenly distribute the strain and wear over the mat.

Heretofore, considerable difficulty has been experienced with the tearing away of the tread at the front edge and the tendency of the tread to roll up at the nose and catch and trip the user of the tread in service. It has also been found that in treads formed of molded rubber composition, in which the material of the tread extended over the nose of the step to which it was applied, the tendency of the tread body was to creep out beyond the front edge of the step. This produces a dangerous condition because, in use, the unsupported portion of the tread tends to trip the user and it also tends to engage the foot of the user particularly in coming down stairs. The corrugations of the tread units heretofore proposed have been so arranged that the weight of the user of the tread is applied in a direction tending to push the tread away from the step on which it is mounted.

These difficulties are substantially overcome by the use of a reenforcement in the nose portion of the tread that can be formed substantially to the shape of the nose of the step and that also provides a substantially rigid tread nose in which the strains imposed by use are well distributed over the tread body. It has also been found that the positioning of the tread corrugations somewhat away from the outer edge of the step and the use of raised corrugations more evenly distribute the strains arising in use through the body of the tread material. The use of raised tread corrugations also deadens tread noise, makes the tread easier to clean, and more comfortable to walk upon.

Other objects and advantages arising from the practice of this invention will be apparent from a consideration of the accompanying specification and drawings showing preferred embodiments of this invention wherein.

Figure 1:
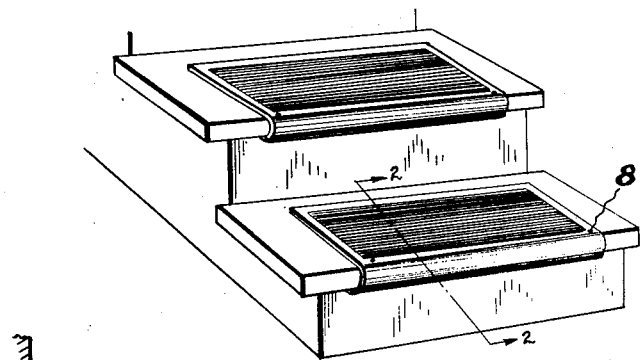
Figure 1 is a perspective view of a pair of stair steps having tread elements of the character herein proposed mounted thereon.
Figure 3:
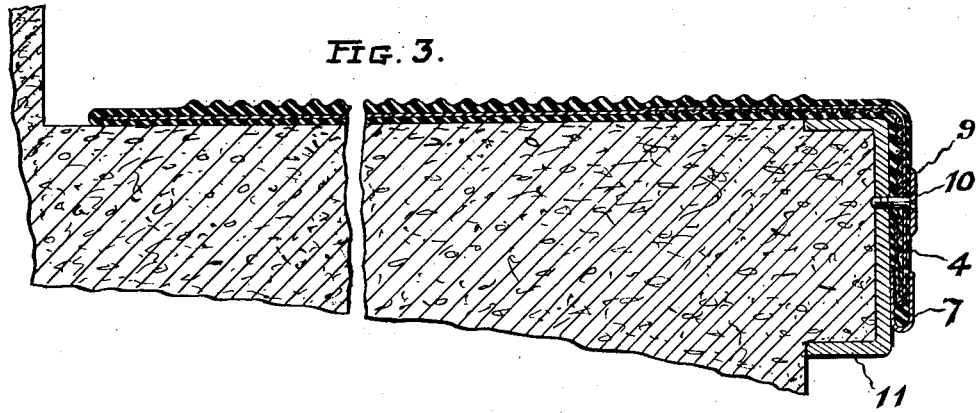
Figure 4:
Figure 11:

1, taken substantially on line 2—2 of Fig. 1, showing a section through the step and also illustrating the manner in which the nose of the tread element can be made to substantially conform to the shape of the step;

Fig. 3 is a corresponding sectional view of a step formed of concrete or other building material, such as generally found in office buildings and the like, wherein the tread is secured to a step of this character;

Fig. 4 is an enlarged sectional view of an unapplied tread element in its completed condition;

Fig. 5 is a top plan view of the tread element shown in Fig. 4, with parts broken away to show the interior construction of the tread;

Fig. 6 is a cross sectional view of the elements making up a tread unit showing the method of assembling the units;

Fig. 7 is a cross sectional view of a mold containing tread units showing a preferred method of manufacturing a tread of the character shown in Fig. 5;

Fig. 8 is a bottom plan view of a modified form of tread reenforcing element constructed in accordance with my invention;

Fig. 9 is a top plan view of a strip of reenforcing material for use in making up a strip of tread material from which lengths may be used as tread elements;

Fig. 10 is a transverse cross sectional view of a completed tread unit incorporating a modified form of reenforcing strip; and Fig. 11 is a transverse cross sectional view of a tread unit constructed in accordance with this invention, and embodying a reenforcing strip of fabric impregnated with hard rubber compound.

Figure 2:
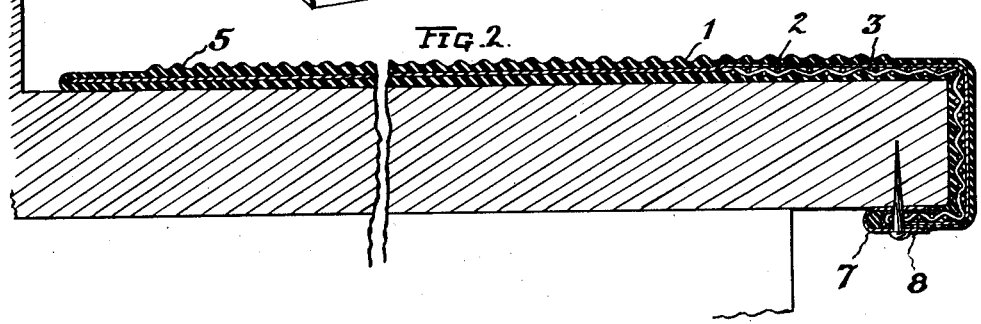
Fig. 2 is an enlarged transverse sectional view of a step of the character shown in Fig.

The tread unit shown in Fig. 2, Fig. 4 and Fig. 5 comprises a body portion 1 of rubber composition that has embedded therein a reenforcing element 2. The reenforcing element 2 is formed of fibrous sheet material such as fabric 3 and a malleable reenforcing element 4 formed of expanded metal woven wire screen, or other suitable malleable material. Woven screen wire having a mesh of about 10 to 12 to the inch has been found satisfactory. The fabric body 3 preferably covers the entire upper face and the nose portion of the malleable reenforcement. The fabric reenforcement may, however, extend only over the malleable reenforcing material.

The tread corrugations 5 are raised above the remainder of the face of the rubber body 1 and are disposed over only a portion of the malleable reenforcement 4.

The ridges 5 of the corrugated tread surface are preferably spaced about $\tfrac{3}{16}$ of an inch between their adjacent apices, whereas the corrugations are raised about $\tfrac{1}{8}$ of an inch above the rubber body 1 of the tread unit. These specific dimensions may, of course, be modified considerably within the scope of the invention. It is desired, however, that the space of the apices of the successive corrugations of the tread unit be substantially one and one-half times the depth of the ridges of the corrugation, in order that the tread unit will have the most desired form.

Arranging the corrugation in this manner greatly deadens the noise of walking on the tread units, it provides a more secure footing for the user than has heretofore been obtained by previously proposed corrugated tread units, and it also provides a form of corrugated tread surface that is much more readily cleaned than the tread units formerly proposed.

The under face of the body portion is provided with a knurled or roughened surface 6 that prevents slipping of the tread on the step. An edge channel 7 is used to protect the front edge of the tread after it is vulcanized and to provide a suitable securing means for holding the tread to the stair step. Suitable holes for receiving securing nails 8 are formed in the channel 7. The nails preferably extend through the reenforcing material 4.

When a tread unit is placed on a step such as that shown in Fig. 1, the nose of the tread is bent to substantially conform to the shape of the tread. A rounded appearance of the tread nose as shown in Fig. 1 is at times more desirable than a closely formed angular fit as shown in Fig. 2. The tread is ordinarily secured in place by means of tacks 8 that extend through the channel 7. A tack is also preferably placed in each edge of the tread near the nose to insure that the tread will lie flat on the step.

When tread units of this character are applied to a step of the form shown in Fig. 3, the under face of the unit may be secured over its entirety to the face of the step by means of shellac, rubber cement, or other suitable material. A metal strip 9 is found desirable to positively hold the tread in place on a step of this character. Suitable screws 10 are threaded into the metal nosing 11 of the step to mount the strip in place.

In the manufacture of a tread unit of the character proposed, the reenforcing unit is first built up from a sheet of fabric that has been frictioned on each side with rubber composition to insure a close union between the fabric and the rubber body of the tread, and a piece of malleable material of sufficient width to extend over the nose portion of the tread.

The fabric base 3, one form of which is shown in Fig. 5, has an edge portion 3ª folded over the edge of the malleable reenforcing material 4 to insure proper embedding of the reenforcing screen 4 in the body of the tread. It is desired in the selection of the reenforcing material 4 to provide a material having apertures therethrough of sufficient size to permit the rubber composition of the tread body to flow through the apertures of the screen and to unite with the fabric on the opposite side of the reenforcing material. The fabric is so arranged that it covers the entire upper face of the reenforcing material although it is only necessary to cover a portion of the lower face of the reenforcing element because the bend in the nose of the tread is in a direction that tends to break the reenforcing material from the body of the tread unit if the fabric is not used over the upper face.

The reenforcing unit may take several forms, one of which is shown in Fig. 5, another shown in Fig. 8, a third shown in Fig. 9, and a fourth shown in Fig. 10. The form of reenforcement shown in Fig. 8 provides a very satisfactory reenforcing element. In this assembly, the fabric body 3 is reenforced along the front edge of the strip of reenforcing material 4 by a strip of frictioned fabric 12 that overlies the wire screening or other malleable material 4, in the zone of the bend that is to be made in the tread unit. The under side of the reenforcing unit is shown in Fig. 8. After the strip 12 and the malleable element 4 are placed on the body portion 3 of the fabric, the upper edge portion 3ª of the fabric body is folded down over the edge of the screen wire 4. A triangular piece of friction fabric 13 is placed over each exposed corner to prevent the wire from cutting through the rubber composition of the tread. The use of the reenforcing strip 12 and the supplemental corner protecting triangles 13 make a very satisfactory reenforcing unit for a tread of the character herein proposed.

The reenforcing element shown in Fig. 9 embodies the same form of fabric backing 3 with a strip 3ª that is folded over the front edge portion of the screen wire 4. A second strip of fabric 14 extends completely along the under side of the rear edge portion of the reenforcing unit 4.

Fig. 10 shows an additional form of reenforcing unit in which only a single piece of fabric 3 is used. In this reenforcing unit, the fabric is formed of sufficient length to provide a portion 3ª that is folded over and that completely covers the reenforcing member 4.

In the manufacture of tread units of the character herein described, the assembled tread reenforcing unit 2 is first made up. After the assembled reenforcing unit 2 is prepared in any suitable manner, it is interposed between a pair of slabs 15 and 16 of uncured rubber composition, the slab 15 being slightly narrower than the slab 16. The end portion 3ᵇ of the fabric sheet 3 is arranged to extend beyond the rubber slabs 15 and 16.

The tread assembly formed in the manner described in connection with Fig. 6 is then placed in a mold cavity such as that shown in Fig. 7 which represents a portion of the mold unit that is arranged to receive four tread units at one time. The mold comprises a top mold plate 20, a bottom mold plate 21, and an interposed separating plate 22. The desired configurations for the tread face of the tread unit are formed in the mold cavities 20 and 21. The interposed plate 22 is roughened or provided with a knurled surface in order to form a roughened face on the under side of the mat. Each of the mold plates 20 and 21 is provided with an overflow cavity 23 into which edge portions 3ᵇ of the fabric strips 3 extend. A slab of rubber composition for the under side of tread is narrower than the slab of rubber for the upper side. It is particularly desirable to have the edge portion of the fabric extend somewhat beyond the molding cavity or to extend at least to the edge of the molding cavity in order to release all entrapped air from within the mold. By permitting the edges of the fabric to extend beyond the molding cavity, the air that travels along the fabric of the reenforcement escapes into the overflow pockets. Heretofore it was found that blisters formed in the edges of the tread. The present method of forming the union between the rubber composition slabs 15 and 16 and the fabric and metal reenforcement overcomes this difficulty.

The form of reenforcement shown in Figs. 9 and 10 is well adapted to be used as a reenforcing element for a continuous strip of tread material. The strip could be formed in any desired length, the tread unit being formed by cutting predetermined lengths of material from the roll. It is intended that the reenforcing unit shown in Fig. 9 be completely embedded in the rubber body. This requires that the reenforcing element in its assembled condition be placed between the slabs of rubber which together constitute the body of the tread unit.

After the assembly of the tread stock, the vulcanization of the rubber body is effected by hot plates, one of which is arranged to give the desired shape to the upper surface of the tread unit and the other of which is arranged to provide a roughened or non-skid surface to the unit. By advancing the stock step by step, strips of any desired length can be made up.

The tread unit shown in Fig. 10 is intended primarily for service requiring that the tread be cemented to the step. A tread unit of this character has no under face of rubber. The under face of fabric reenforcing unit forms the exposed under face of the tread unit. This form of tread is particularly desirable in installations where the tread is cemented, shellacked, or otherwise secured to the step with which it is to be used. A tread of the form shown in Fig. 10 may readily be made up to any desired length in a manner corresponding to the method of manufacture of a tread embodying the strip shown in Fig. 9.

After the tread units are completely vulcanized, the edge of the fabric that extends beyond the tread unit is trimmed to provide a neat appearance to the finished article.

Fig. 11 of the drawings shows an additional form of malleable reenforcement for the nose portion of the tread that is capable of being given the desired shape to conform to the nose of the stair to which it is applied. In this application of the invention, I prefer to use a hard rubber-impregnated strip 25 of heavy fabric, such, for instance, as breaker fabric that is customarily used in the formation of breaker strips for pneumatic tires, as the malleable reenforcing material. This heavy fabric body serves as a carrier for a strip of hard rubber compound that renders it relatively stiff when cold and capable of holding a preformed shape. A tread of this particular character may be molded flat and subsequently shaped to the nose of the tread by dipping the nose portion of the tread in hot water, or otherwise heating it, so that the hard rubber compound carried by the breaker strip is made soft and capable of being shaped to conform to the nose of the step to which the tread is applied. After cooling, the hard rubber compound again becomes hardened. A tread reenforced by a hard rubber of the above character can also be shaped while hot when the tread is first taken from the mold. It is a well known fact that hard rubber becomes sufficiently malleable when heated to a certain temperature to be formed in the manner specified.

The stair tread units herein described and their method of manufacture are intended as illustrative of the principles of my invention and are not to be construed as limiting the invention to the specific construction shown since many other applications of the invention will be obvious to one skilled in the art.

What I claim is:

1. A stair tread comprising a body of rubber composition, a reenforcement of metal embedded in the nose portion of the tread, and a reenforcement of fabric overlying the metal reenforcement.

2. A stair tread comprising a body of rubber composition, a reenforcement of metal embedded in the nose portion of the tread, and a reenforcement of fabric overlying the metal reenforcement, said tread having raised non-skid projections formed on its upper face.

3. A stair tread comprising a body of rubber composition, a reenforcement of metal embedded in the nose portion of the tread, and a reenforcement of fabric overlying the metal reenforcement, said tread having non-skid projections formed on its upper face extending over a major part of the tread body but over only one edge portion of the metal reenforcement.

4. A stair tread comprising a body of rubber composition, a reenforcement of metal embedded in the nose portion of the tread, a reenforcement of fabric overlying the metal reenforcement and a facing of fibrous material completely covering the under surface of the unit.

5. A stair tread comprising a reenforcing element of fabric extending substantially throughout the entire body of the tread, a reenforcing element of malleable material arranged solely in the nose portion of the tread underlying the fabric element, a tread surface for the upper face of said unit formed of raised corrugations extending longitudinally of the tread from adjacent the rear edge thereof to the zone of the body of the reenforcing element of malleable material, said raised corrugations overlying only a fractional part of the reenforcement of malleable material.

6. A tread unit comprising a fabric insert, an insert of malleable material embedded in the nose portion of the unit, tread corrugations formed on the upper surface of said unit and extending longitudinally thereof, said corrugations terminating a considerable distance from the nose portion of the tread and overlying a portion of said malleable reenforcing material.

7. Material for forming tread units comprising a roll of material having fabric reenforcement over a major portion of the body of the unit, a reenforcement of malleable material extending the entire length of the unit and embedded therein adjacent the nose portion thereof and a body portion of vulcanized rubber composition covering the entire upper surface of said unit.

8. Material for forming tread units comprising a roll of material having a fabric reenforcement in a major portion of the body of the unit, a reenforcement of malleable material extending the entire length of the unit and embedded therein adjacent the nose portion thereof, and a body portion of vulcanized rubber composition covering the entire upper surface of said unit, said upper surface having a series of corrugations extending longitudinally thereof spaced a considerable distance from the nose portion of said unit and overlying only a fractional portion of the malleable reenforcement.

9. A roll of material for forming tread units comprising a body portion of vulcanized rubber composition covering the entire upper surface of said unit, said body being reenforced with fabric over a major portion thereof, a reenforcement of malleable material extending the entire length of the material and embedded in the body adjacent the nose portion thereof, the upper surface of said body having a series of corrugations extending longitudinally thereof spaced a considerable distance from the nose of said unit and overlying only a fractional portion of the malleable reenforcement, said corrugations being raised above the remainder of the surface of the unit.

10. A material for covering stair steps comprising a body portion of rubber composition, a reenforcing element embedded solely in the zone of the nose portion of the step covering that is capable of being formed into predetermined shape and of maintaining the predetermined shape.

11. A tread unit for use on stair steps comprising a body portion of rubber composition, a reenforcing element integrally united with the body portion of the tread and extending only slightly beyond the nose portion of the tread unit, said reenforcing element being rendered sufficiently malleable to take a shape corresponding to the shape of the nose of the step to which said unit is applied, said tread unit being capable of maintaining its shape after being so formed.

12. A molded rubber tread unit comprising a body of rubber composition, reenforcing material embedded in the nose portion of the unit and extending rearwardly therefrom in the body portion, raised tread corrugations formed on the upper surface of the body portion terminating a considerable distance from the nose portion of the tread and overlying a portion of said reenforcing material.

In testimony whereof I affix my signature.

GEORGE S. FRAZIER.